(12) United States Patent
Naito et al.

(10) Patent No.: US 8,420,249 B2
(45) Date of Patent: Apr. 16, 2013

(54) BATTERY MODULE AND BATTERY PACK (75) Inventors: Keisuke Naito, Osaka (JP); Shinya Geshi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/499,869

(22) PCT Filed: Aug. 24, 2011

(86) PCT No.: PCT/JP2011/004704
§ 371 (c)(1),
(2), (4) Date: Apr. 2, 2012

(87) PCT Pub. No.: WO2012/073403
PCT Pub. Date: Jun. 7, 2012

(65) Prior Publication Data
US 2012/0263995 A1 Oct. 18, 2012

(30) Foreign Application Priority Data
Nov. 30, 2010 (JP) .................................. 2010-266803

(51) Int. Cl.
*H01M 2/16* (2006.01)
*H01M 2/10* (2006.01)
*H01M 10/38* (2006.01)

(52) U.S. Cl.
USPC ............... 429/146; 429/96; 429/99; 429/100; 429/123

(58) Field of Classification Search ............. 429/96–100
See application file for complete search history.

(56) References Cited

U.S. PATENT DOCUMENTS

| 6,174,618 B1 | 1/2001 | Nishiyama et al. |
| 2009/0104516 A1 | 4/2009 | Yoshihara et al. |
| 2011/0195284 A1 | 8/2011 | Yasui et al. |

FOREIGN PATENT DOCUMENTS

| EP | 0 905 803 A1 | 3/1999 |
| JP | 11-111248 A | 4/1999 |
| JP | 2001-155702 A | 6/2001 |
| JP | 2007-005288 A | 1/2007 |
| JP | 2009-099452 A | 5/2009 |
| JP | 2010-033913 A | 2/2010 |
| JP | 2010-040243 A | 2/2010 |
| JP | 2010-140695 A | 6/2010 |
| WO | WO 2006/126447 A1 | 11/2006 |
| WO | WO 2010/067602 A1 | 6/2010 |

OTHER PUBLICATIONS

International Search Report issued in International Patent Application No. PCT/JP2011/004704, dated Nov. 15, 2011.

*Primary Examiner* — Matthew Merkling
(74) *Attorney, Agent, or Firm* — McDermott Will & Emery LLP (57) ABSTRACT

A battery module in which a plurality of cells are aligned includes a holder in which the cells are accommodated, a positive electrode current collector plate which is provided to face positive electrode terminals of the cells and electrically connects the positive electrode terminals, and a negative electrode current collector plate which is provided to face negative electrode terminals of the cells and electrically connects the negative electrode terminals, wherein the holder includes a plurality of accommodation sections, the cells are accommodated in the accommodation sections, a spacer made of an elastic member is disposed between the positive electrode current collector plate and the cells, the spacer further includes an extended portion extending toward the negative electrode terminals of the cells, and an edge of the extended portion close to the negative electrode terminals touches the negative electrode current collector plate.

14 Claims, 7 Drawing Sheets

BATTERY MODULE AND BATTERY PACK

RELATED APPLICATIONS

This application is the U.S. National Phase under 35 U.S.C. §371 of International Application No. PCT/JP2011/004704, filed on Aug. 24, 2011, which in turn claims the benefit of Japanese Application No. 2010-266803, filed on Nov. 30, 2010, the disclosures of which Applications are incorporated by reference herein.

TECHNICAL FIELD

The present invention relates to battery modules including a plurality of cells, and to battery packs in which a plurality of battery modules are aligned.

BACKGROUND ART

Battery packs including a plurality of batteries accommodated in a case to allow an output of a predetermined voltage and capacitance are widely used as power sources of various devices, vehicles, etc. Specifically, the technique of forming modules of battery assemblies obtained by connecting general-purpose batteries in parallel and/or in series to output a predetermined voltage and capacitance, and combining the battery modules together to be applicable to various applications is beginning to be used. This module forming technique can reduce the size and weight of the battery modules themselves by increasing the performance of batteries accommodated in the battery modules. Thus, this module forming technique has various advantages, an example of which is that workability can be improved in assembling a battery pack, and the flexibility in mounting the battery module in areas of limited space, such as a vehicle, can be increased.

When a plurality of batteries are accommodated in a case, from a safety standpoint, short-circuiting between the batteries and the influence of external vibration have to be prevented. For this purpose, there is a known technique of fitting a positive electrode portion and a negative electrode portion of a battery into respective holes formed in a supporting body, thereby preventing short-circuiting between batteries and the influence of external vibration (e.g., see Patent Document 1).

Citation List
Patent Document
PATENT DOCUMENT 1: Japanese Patent Publication No. H11-111248

SUMMARY OF THE INVENTION

Technical Problem

In the case of a plurality of batteries densely accommodated in a case in order to increase the energy density of a battery module, if external impact is exerted on the case, the impact strongly influences the batteries. Moreover, when a plurality of battery modules are aligned to form a battery pack, impact may be exerted on the battery modules from every direction.

In view of the foregoing, the present invention was devised. It is a primary objective of the present invention to provide a battery module in which impact on batteries can be alleviated even when the impact is exerted on the batteries from every direction.

Solution to the Problem

To achieve the objective described above, according to the present invention, a battery module in which a plurality of batteries (hereinafter batteries used in a battery module are referred to as "cells") are accommodated in a holder includes a spacer made of an elastic member and disposed between a current collector plate for electrodes having one polarity and the cells, wherein an extended portion which extends from a predetermined position of the spacer toward terminals of electrodes having the other polarity touches a current collector plate for the electrodes having the other polarity.

With this configuration, impact exerted toward the electrodes having one polarity of the cells and impact exerted toward side surfaces of the cells are alleviated due to elastic distortion of the spacer and the extended portion, and impact exerted toward the electrodes having the other polarity of the cells are absorbed due to elastic distortion of the extended portion which touches the current collector plate for the electrodes having the other polarity, so that the impact exerted on the cells can be alleviated. Thus, even when impact is exerted from every direction, the impact on the cells can be alleviated, so that a highly safe battery module can be obtained.

Advantages of the Invention

According to the present invention, even when impact is exerted from every direction, it is possible to obtain a highly safe battery module in which the impact on the cells can be alleviated.

DESCRIPTION OF EMBODIMENTS

Embodiments of the present invention will be described in detail below with reference to the drawings. The present invention is not limited to the following embodiments. The embodiment can be modified without deviating from the effective scope of the present invention. The embodiment can be combined with other embodiments.

Figure 1:
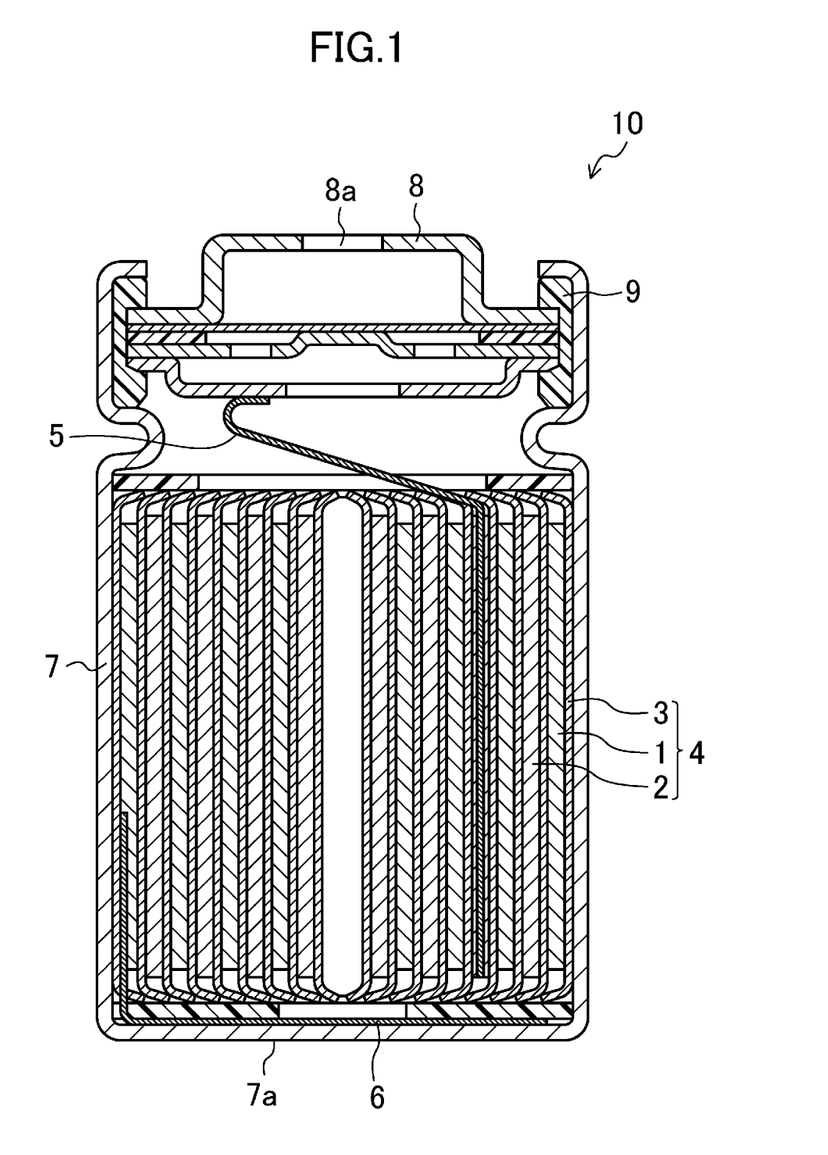
FIG. 1 is a cross-sectional view schematically illustrating a configuration of a cell used in a battery module of the present invention.

FIG. 1 is a cross-sectional view schematically illustrating a configuration of a cell 10 used in a battery module of the present invention. Note that the type of the cell 10 of the present invention is not particularly limited, and for example, secondary batteries such as lithium-ion batteries, nickel-hydrogen batteries, etc. can be used. Moreover, the cell 10 may be a cylindrical battery, or may be a rectangular battery.

As illustrated in FIG. 1, an opening of a cell case 7 of the cell 10 is sealed with a sealing plate 8 via a gasket 9. In the cell case 7, an electrode group 4 formed by winding a positive electrode plate 2 and a negative electrode plate 1 with a separator 3 interposed between the positive electrode plate 2 and the negative electrode plate 1 is accommodated together with an nonaqueous electrolyte. The positive electrode plate 2 is connected via a positive electrode lead 5 to the sealing plate 8 also serving as a positive electrode terminal. Moreover, the negative electrode plate 1 is connected via a negative electrode lead 6 to a bottom of the cell case 7, the bottom also serving as a negative electrode terminal. Note that an opening portion 8a is formed in the sealing plate 8, and when abnormal gas is generated in the cell 10, the abnormal gas is released through the opening portion 8a to the outside of the cell case 7.

Figure 2:
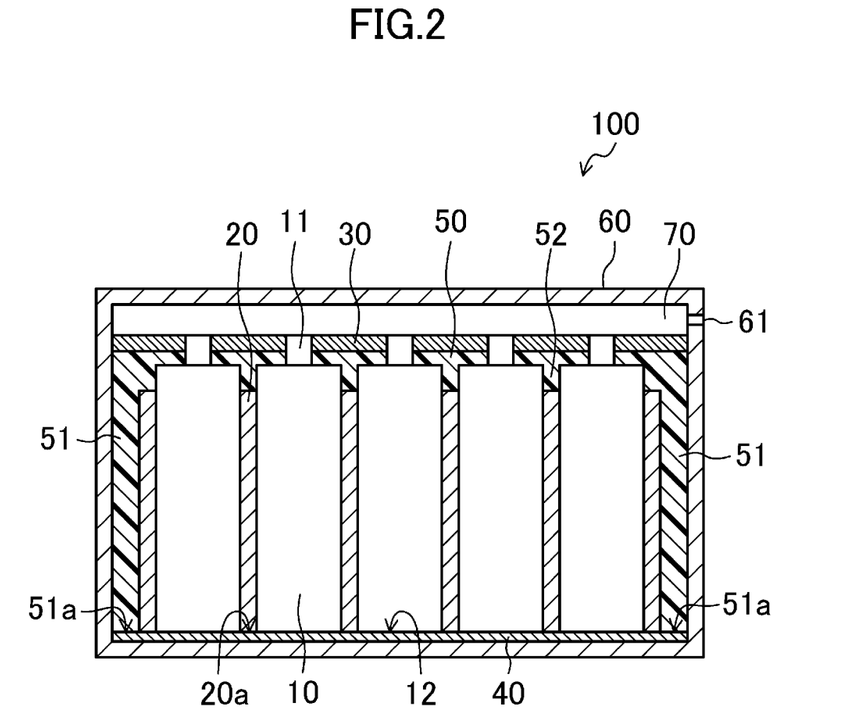
FIG. 2 is a cross-sectional view schematically illustrating a configuration of a battery module of an embodiment of the present invention.
Figure 3A:
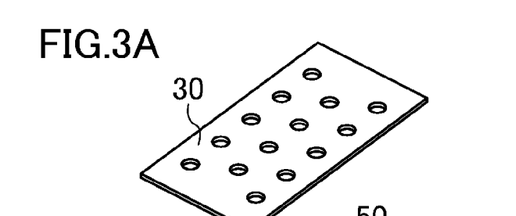
FIGS. 3A-3E show an exploded perspective view illustrating an internal configuration of the battery module of the embodiment of the present invention.

FIG. 2 is a cross-sectional view schematically illustrating a configuration of a battery module 100 of an embodiment of the present invention. Moreover, FIGS. 3A-3E show an exploded perspective view of an internal configuration of the battery module 100, and FIG. 3F is a perspective view illustrating the battery module 100 in an assembled state.

As illustrated in FIG. 2, the battery module 100 includes multiple ones of the cell 10 which are aligned with the same polarity being in the same direction, and are accommodated in a case 60. The plurality of cells 10 are accommodated in a holder 20 as illustrated in FIG. 3D, and the cells 10 are accommodated in accommodation sections formed in the holder 20.

Here, the holder 20 is preferably made of a material having thermal conductivity, for example, aluminum, etc. Thus, heat generated in the cell 10 can rapidly be dissipated into the holder 20, so that a temperature rise of the cell 10 can effectively be reduced. Moreover, each cell 10 is preferably accommodated in the accommodation section 21 so that an outer circumferential surface of the cell 10 touches an inner circumferential surface of the accommodation section 21 of the holder 20. Thus, heat generated in the cell 10 can more rapidly be dissipated into the holder 20.

A positive electrode current collector plate 30 for electrically connecting the positive electrode terminals 11 of the plurality of cells 10 is disposed to face positive electrode terminals 11. Moreover, a negative electrode current collector plate 40 for electrically connecting the negative electrode terminals 12 to each other is disposed to face negative electrode terminals 12. Note that when the plurality of cells 10 are aligned with the same polarity being in the same direction as in the case of the present embodiment, forming the positive electrode current collector plate 30 by a positive electrode bus bar made of an electrically conductive flat plate as illustrated in FIG. 3A can easily achieve parallel connection. In the same way, forming the negative electrode current collector plate 40 by a negative electrode bus bar made of an electrically conductive flat plate as illustrated in FIG. 3E can easily achieve parallel connection. Note that in the present invention, the relationship of electrical connection between the cells 10 is not particularly limited, and the cells 10 may be electrically connected in series. Alternatively, the positive electrode current collector plate 30 and the negative electrode current collector plate 40 may be made of, for example, circuit boards on which wiring patterns for electrically connecting the cells 10 are formed.

Moreover, through holes into which positive electrode terminals 11 of the cells 10 are inserted are formed in the positive electrode current collector plate 30 as illustrated in FIG. 3A, thereby allowing abnormal gas released from the cell 10 to be released via an exhaust chamber 70 formed by the case 60 and the positive electrode current collector plate 30 through an outlet 61 of the case 60 to the outside of the case 60 as illustrated in FIG. 2.

Figure 3B:
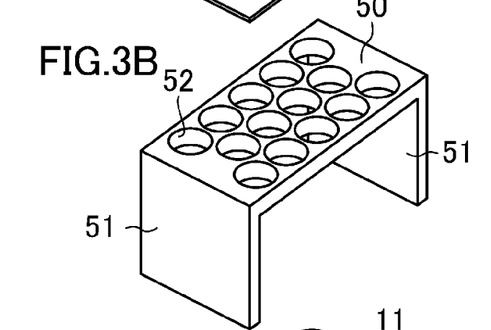
Figure 3C:
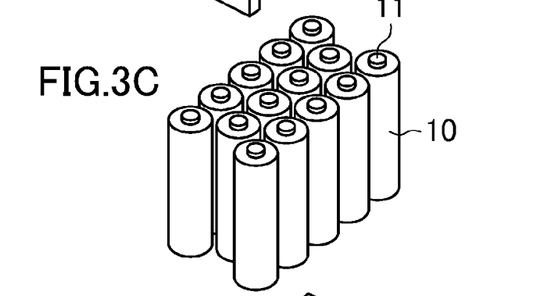
Figure 3D:
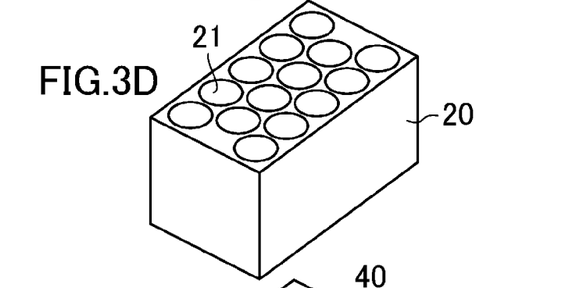
Figure 3E:
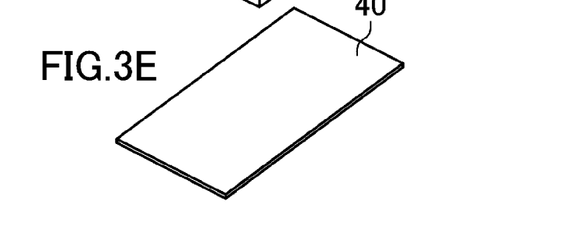
Figure 3F:
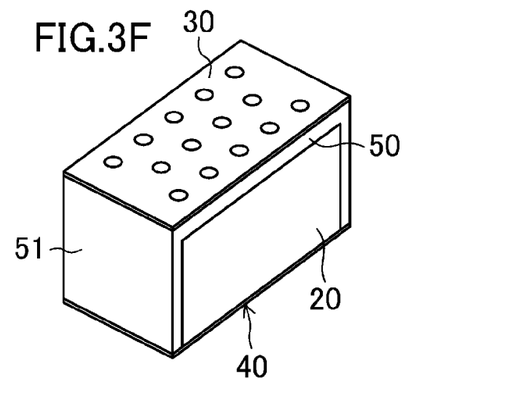
FIG. 3F is a perspective view illustrating the battery module in an assembled state.

The battery module 100 of the present invention is characterized in that as illustrated in FIG. 2 and FIG. 3B, a flat-plate spacer 50 made of an elastic member is disposed between the positive electrode current collector plate 30 and the cells 10, the spacer 50 is further provided with flat-plate extended portions 51 extending from edges of the spacer 50 toward the negative electrode terminals 12 of the cells 10, and edges of the extended portions 51 close to the negative electrode terminals 12 touch edges of the negative electrode current collector plate 40.

The advantages obtained from such a configuration will be described below with reference to FIG. 4 and FIG. 5. Here, FIG. 4 and FIG. 5 are cross-sectional views illustrating configurations of a battery module 100 of the present embodiment, the configurations being the same as the configuration of the battery module 100 of FIG. 2.

Figure 4:
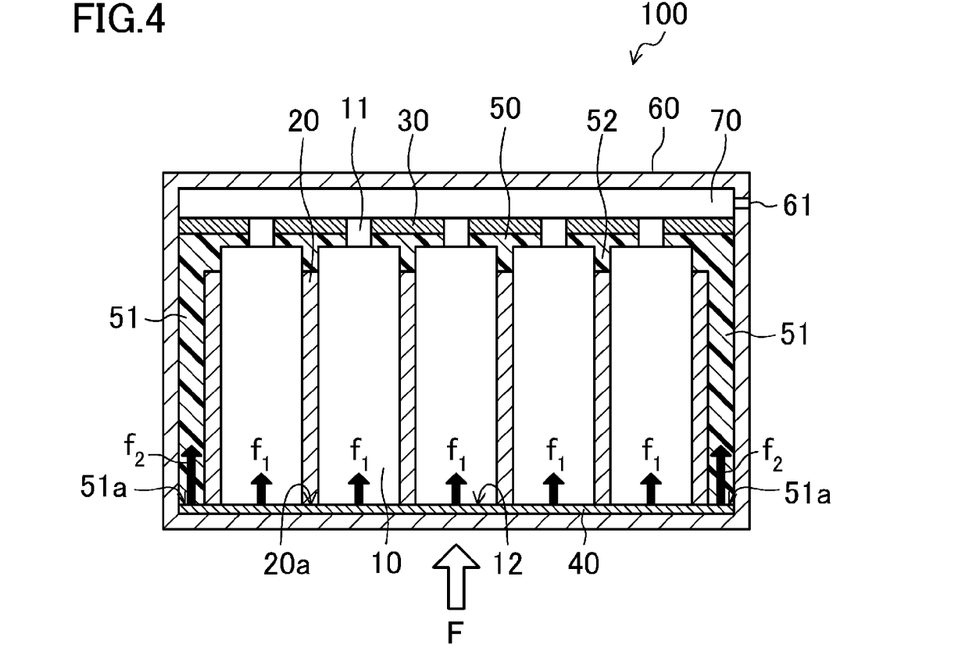
FIG. 4 is a cross-sectional view illustrating a configuration of a battery module with reference to which the advantages of the invention are described.

As illustrated in FIG. 4, when on the battery module 100, impact F as indicated by the arrow in the figure is exerted toward the negative electrode terminals 12 of the cells 10, the impact F is exerted on the negative electrode current collector plate 40 via a bottom of the case 60. Here, force $f_1$ obtained by dividing the impact F is applied on each cell 10 via the negative electrode current collector plate 40. However, since the edges of the negative electrode current collector plate 40 touch the edges 51a of the extended portions 51 of the spacer 50, most of the impact F is absorbed due to elastic distortion of the extended portions 51 of the spacer 50 made of an elastic member. Thus, the divided force $f_1$ applied on each cell 10 is alleviated.

Moreover, the negative electrode terminals 12 of the cells 10 are connected via a lead or a fuse (not shown) to the negative electrode current collector 40. However, since the impact F is absorbed by the extended portions 51 of the spacer 50 even when the impact F is exerted toward the negative electrode terminals 12, deformation and disconnection of the lead or the fuse can be prevented.

Figure 5:
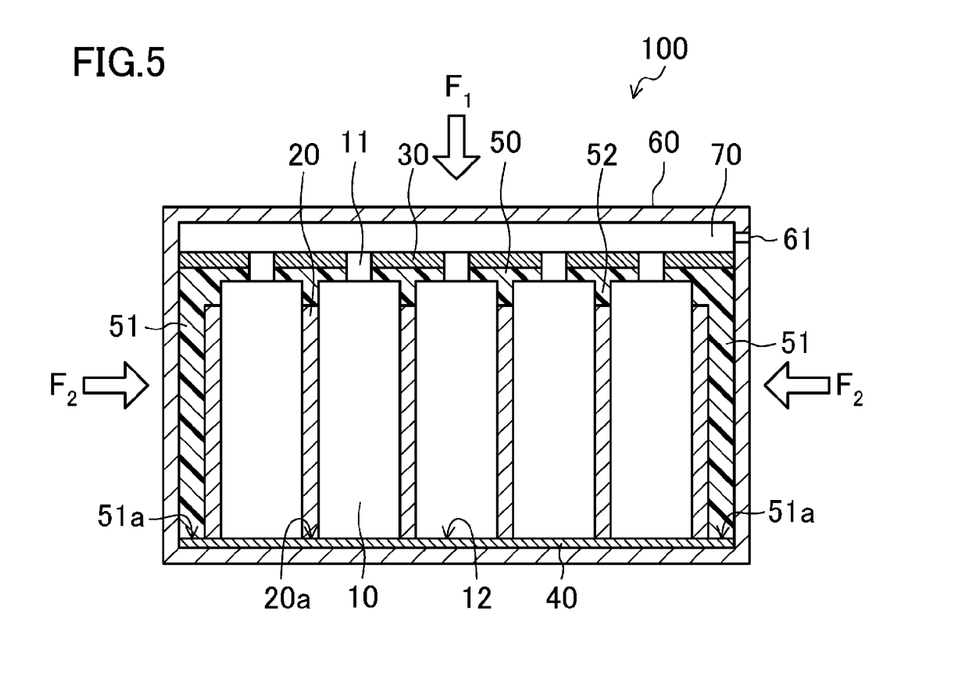
FIG. 5 is a cross-sectional view illustrating a configuration of a battery module with reference to which the advantages of the invention are described.

Next, as illustrated in FIG. 5, when on the battery module 100, impact $F_1$ as indicated by the arrow in the figure is exerted toward the positive electrode terminals 11 of the cells 10, the impact $F_1$ is exerted on the positive electrode current collector plate 30 via a top portion of the case 60. However, the flat-plate spacer 50 made of an elastic member is disposed between the positive electrode current collector plate 30 and the cells 10, and thus most of the impact $F_1$ is alleviated due to elastic distortion of the spacer 50. Thus, only force obtained by significantly alleviating the impact $F_1$ is applied on each cell 10.

Moreover, as illustrated in FIG. 5, when on the battery module 100, impact $F_2$ as indicated by the arrows in the figure is exerted toward side surfaces of the cells 10, the impact $F_2$ is exerted on the extended portions 51 of the spacer 50 via side surfaces of the case 60. Thus, most of the impact $F_2$ is alleviated due to elastic distortion of the extended portions 51 of the spacer 50, so that only force obtained by significantly alleviating the impact $F_2$ is applied to each cell 10.

As described above, the battery module 100 of the present invention is configured so that, as illustrated in FIG. 2 and FIG. 3, the spacer 50 made of an elastic member is disposed between the positive electrode current collector plate 30 and the cells 10, and the edges of the extended portions 51 which extend from the edges of the spacer 50 toward the negative electrode terminals 12 of the cells 10 touch the negative electrode current collector plate 40. With this configuration, even when impact is exerted from every direction, it is possible to alleviate the impact on the cells. Thus, it is possible to obtain highly safe battery modules.

Here, "touch" means a state in which the edges of the extended portions 51 and the negative electrode current collector plate are fixed to the extent that the positional relationship between the edges of the extended portions 51 and the negative electrode current collector plate is maintained even when external impact is exerted, and includes, for example, a state in which the edges of the extended portions 51 and the negative electrode current collector plate are connected to each other by bolts, etc. or fixed to each other by an adhesive.

The material for the spacer 50 of the present invention is not particularly limited as long as the spacer 50 is an elastic member. The elastic property (e.g., coefficient of elasticity, etc.) of materials used for the spacer 50 can accordingly be determined within a range in which the advantage of alleviating externally exerted impact are obtained. The spacer 50 is preferably made of resin, and for example, polystyrene, polypropylene, polyphenylene ether, tetrafluoroethylene-perfluoroalkylvinylether copolymer, polycarbonate, polyphenylene sulfide, polybutylene terephthalate, silicone, or the like may be used.

Moreover, as long as the spacer 50 (inclusive of the extended portions 51) of the present invention has a flat-plate shape having a predetermined width, the shape of the spacer 50 is not particularly limited. For example, when the width of the spacer 50 is substantially the same as the width of the positive electrode current collector plate 30 and the negative electrode current collector plate 40, the effect of alleviating externally exerted impact can further be increased.

Moreover, as illustrated in FIG. 3B, when through holes 52 in which the positive electrode terminals 11 of the cells 10 are inserted are formed in the spacer 50 in the same manner as the positive electrode current collector plate 30, abnormal gas released from the cell 10 can be released via the exhaust chamber 70 through the outlet 61 to the outside of the case 60.

FIGS. 6A-6D are perspective views illustrating example configurations of the spacer 50 of the present embodiment.

Figure 6A:
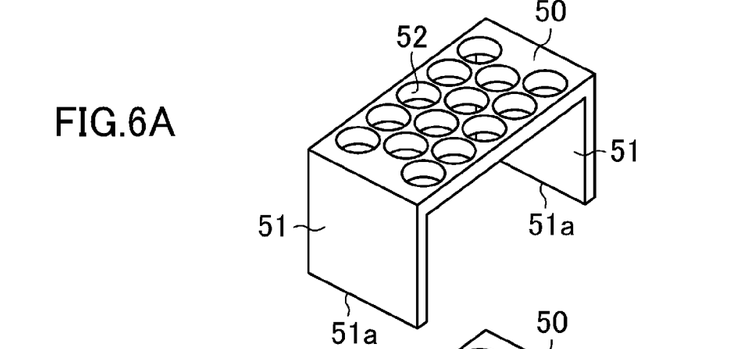
FIGS. 6A-6D are perspective views illustrating example configurations of the spacer of the embodiment of the present invention.

The spacer 50 illustrated in FIG. 6A has the same configuration as that of FIG. 3B. The spacer 50 includes a pair of extended portions 51, 51 which extend from both edges of the spacer 50 toward the negative electrode terminals 12 of the cells 10, and are parallel to each other. Edges 51a, 51a of the pair of extended portions 51, 51 close to the negative electrode terminals 12 touch both edges of the negative electrode current collector plate 40, respectively.

Figures 6B, 6C, 6D:
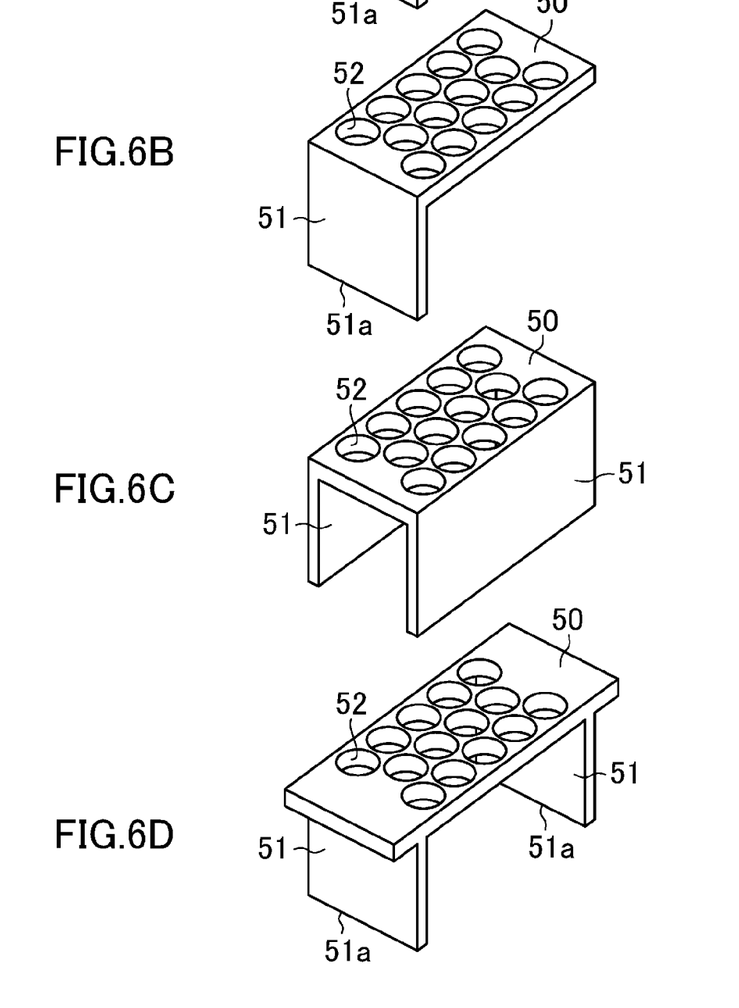

The spacer 50 illustrated in FIG. 6B includes only one extended portion 51 which extends from an edge of the spacer 50. Also with this configuration, even when impact F as indicated by the arrow in FIG. 4 is exerted toward the negative electrode terminals 12 of the cells 10, the effect of absorbing the impact F due to elastic distortion of the extended portion 51 is not lost because an edge 51a of the extended portion 51 close to the negative electrode terminals 12 touches an edge of the negative electrode current collector plate 40.

The spacer 50 illustrated in FIG. 6C includes a pair of extended portions 51, 51 which extend from both edges in a width direction of the spacer 50 toward the negative electrode terminals 12 of the cells 10, and are parallel to each other. With this configuration, edges of the pair of extended portions 51, 51 close to the negative electrode terminals 12 touch the negative electrode current collector plate 40 along a longitudinal direction of the negative electrode current collector plate 40.

In the spacer 50 illustrated in FIG. 6D, the pair of extended portions 51, 51 of FIG. 6A extend not from both the edges of the spacer 50 but from inner positions relative to the edges of the spacer 50 toward the negative electrode terminals 12 of the cells 10. That is, the pair of extended portions 51, 51 may extend from any positions of the spacer 50 toward the negative electrode terminals 12 of the cells 10 as long as the extended portions 51, 51 do not touch outermost cells 10.

Figure 7:
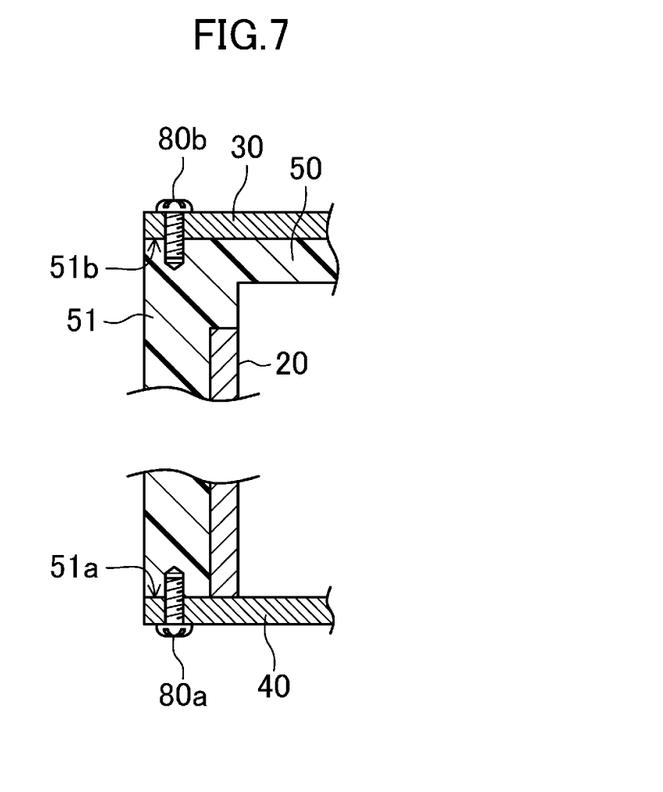
FIG. 7 is a partial cross-sectional view illustrating an example method for allowing an edge of an extended portion of the spacer to touch a negative electrode current collector plate.

FIG. 7 is a partial cross-sectional view illustrating an example method for allowing the edge 51a of the extended portion 51 of the spacer 50 close to the negative electrode terminals 12 to touch the negative electrode current collector plate 40.

As illustrated in FIG. 7, screw holes (or holt holes) are formed in the edge 51a of the extended portion 51 and the negative electrode current collector plate 40, and thus, the edge 51a of the extended portion 51 can be connected to negative electrode current collector plate 40 by a screw 80a. Note that when screw holes (or bolt holes) are formed in an edge 51b of the spacer 50 and in the positive electrode current collector plate 30, the edge of the spacer 50 can be connected to the positive electrode current collector plate 30 by a screw 80b. Alternatively, the bolt holes may be insert nuts as separate components.

Figure 8A:
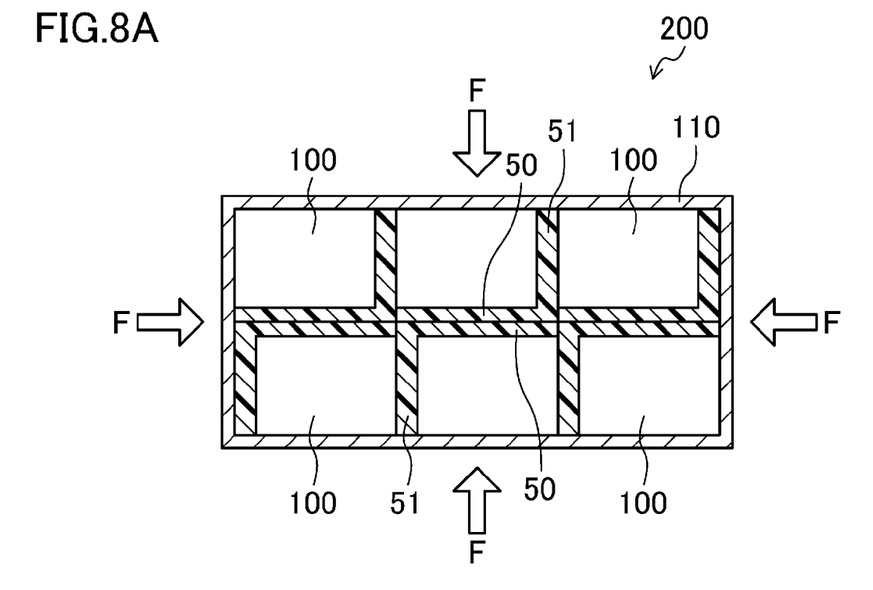
FIG. 8A, 8B are cross-sectional views each schematically illustrating a configuration of a battery pack in which multiple ones of the battery module of the present invention are aligned.
Figure 8B:
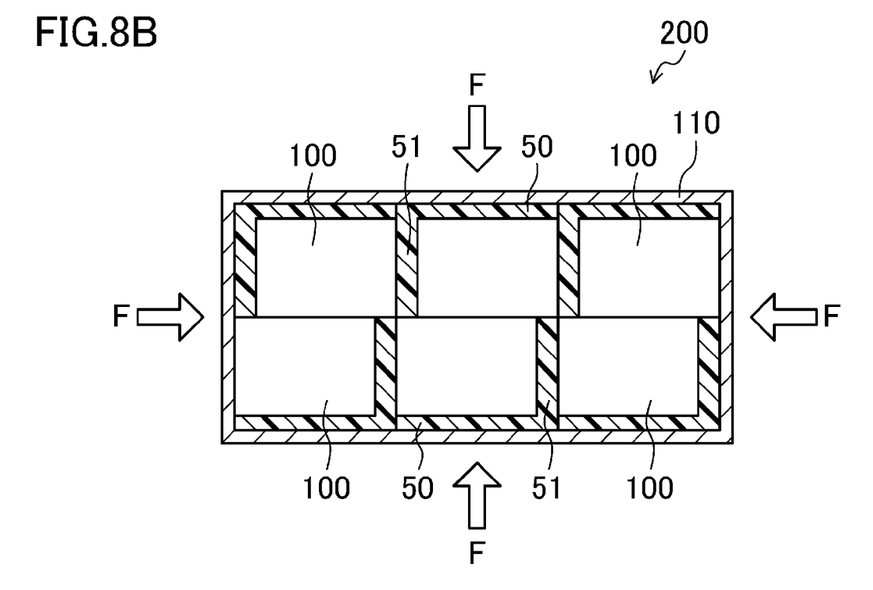

FIGS. 8A, 8B are cross-sectional views each schematically illustrating a configuration of a battery pack 200 in which multiple ones of the battery module 100 of the present invention are aligned. Note that for simplicity of description, only a spacer 50 and an extended portion 51 of the spacer 50 of each battery module 100 are shown. Note that each spacer 50 used here has the configuration of FIG. 6B.

In the battery pack 200 illustrated in FIG. 8A, the battery modules 100 arranged at a lower level are aligned so that the extended portions 51 of the spacers 50 face the same direction in a position in which the positive electrode terminals 11 of the cells 10 face upward. Moreover, the battery modules 100 arranged at an upper level are aligned so that the extended portions 51 of the spacers 50 face the same direction in a position in which the positive electrode terminals 11 of the cells 10 face downward. The battery modules 100 aligned at the upper and lower levels are accommodated in a pack case 110.

Even when impact F as indicated by the arrows in FIG. 8A is exerted on an upper surface, a lower surface and side surfaces of the battery pack 200, as described above, the spacers 50 and their extended portions 51 disposed in the battery modules 100 can alleviate the impact exerted on the cells 10. In this way, the battery pack 200 can be arranged in any direction, and it is possible to alleviate impact on the cells 10 included in the battery modules 100. Thus, a highly safe battery pack 200 can be obtained.

In the battery pack 200 illustrated in FIG. 8B, the battery modules 100 at the upper level and the battery modules 100 at the lower level of the battery pack 200 of FIG. 8A are exchanged*. In this case also, even when impact F as indicated by the arrows in FIG. 8B is exerted on an upper surface, a lower surface, and side surfaces of the battery pack 200, as described above, the spacers 50 and their extended portions 51 disposed in the battery modules 100 can alleviate the impact exerted on the cells 10.

It should be recognized that the foregoing embodiments are only preferred examples of the present invention, and should not be taken as limiting the scope of the present invention, and various changes and modifications may be made.

For example, in the embodiment described above, the flat-plate spacer 50 made of an elastic member is disposed between the positive electrode current collector plate 30 and the cells 10, the spacer 50 further includes the flat-plate extended portion 51 extending toward the negative electrode terminals 12 of the cells 10, and the edge 51a of the extended portion 51 close to the negative electrode terminals touches the negative electrode current collector plate 40. However, the flat-plate spacer 50 made of an elastic member may be disposed between the negative electrode current collector plate 40 and the cells 10, the spacer 50 may further include a flat-plate extended portion extending toward to the positive electrode terminals 11 of the cells 10, and an edge of the extended portion close to the positive electrode terminals may touch the positive electrode current collector plate 30.

That is, the battery module of the present invention includes a first electrode current collector plate which is disposed to face terminals of first electrodes of a plurality of cells, and electrically connects the first electrode terminals, and a second electrode current collector plate which is disposed to face terminals of second electrodes of the plurality of cells, and electrically connects the terminals of the second electrodes, wherein a spacer made of an elastic member is disposed between the first electrode current collector plate and the cells, the spacer further includes an extended portion extending toward the terminals of the second electrodes of the cells, and an edge of the extended portion close to the terminals of the second electrodes touches the second electrode current collector plate.

Moreover, in the embodiment described above, the spacer 50 includes a pair of extended portions 51 which extend from both edges of the spacer 50 toward the negative electrode terminals 12 of the cells 10 and are parallel to each other, and edges 51a of the pair of extended portions 51 close to the negative electrode terminals touch the negative electrode current collector plate 40. However, the spacer 50 may include a pair of extended portions which extend from both edges of the spacer 50 toward the positive electrode terminals 11 of the cells 10 and are parallel to each other, and edges of the pair of extended portions close to the positive electrode terminals may touch the positive electrode current collector plate 30.

Industrial Applicability

The present invention is useful for power sources for driving vehicles, electrical motorcycle, electrical play equipment, or the like.

Description of Reference Characters

| | |
|---|---|
| 1 | Negative Electrode Plate |
| 2 | Positive Electrode Plate |
| 3 | Separator |
| 4 | Electrode Group |
| 5 | Positive Electrode Lead |
| 6 | Negative Electrode Lead |
| 7 | Battery Case |
| 8 | Sealing Plate |
| 8a | Opening Portion |
| 9 | Gasket |
| 10 | Cell |
| 11 | Positive Electrode Terminal |
| 12 | Negative Electrode Terminal |
| 20 | Holder |
| 21 | Accommodation Section |
| 30 | Positive Electrode Current Collector Plate |
| 40 | Negative Electrode Current Collector Plate |
| 50 | Spacer |
| 51 | Extended Portion |
| 51a | Edge of Extended Portion |
| 60 | Case |
| 61 | Outlet |
| 70 | Exhaust Chamber |
| 80a, 80b | Screw |
| 100 | Battery Module |
| 110 | Pack Case |
| 200 | Battery Pack |

The invention claimed is:

1. A battery module in which a plurality of cells are aligned, the battery module comprising:
   a holder having accommodation sections in which the plurality of cells are accommodated such that terminals of first electrodes are aligned at one side and terminals of second electrodes are aligned at the other side;
   a first electrode current collector plate which is provided to face terminals of first electrodes of the plurality of cells, and electrically connects the terminals of the first electrodes in parallel; and
   a second electrode current collector plate which is provided to face terminals of second electrodes of the plurality of cells, and electrically connects the terminals of the second electrodes in parallel; wherein
   a spacer made of an elastic member is disposed between the first electrode current collector plate and the cells,
   the spacer further includes an extended portion extending from the side at which the terminals of the first electrodes of the cells are aligned toward the terminals of the second electrodes of the cells along side surfaces of the cells, and
   an edge of the extended portion close to the terminals of the second electrodes touches the second electrode current collector plate.

2. The battery module of claim 1, wherein the spacer includes through holes through which abnormal gas released from the plurality of cells is released.

3. The battery module of claim 2, wherein the first electrode current collector plate and the spacer partition an exhaust chamber via which the abnormal gas is released from the accommodation sections.

4. The battery module of claim 1, wherein the terminals of the second electrodes of the cells are connected to the second electrode current collector plate via a lead or a fuse.

5. The battery module of claim 1, wherein the first electrode is a positive electrode, and the second electrode is a negative electrode.

6. The battery module of claim 1, wherein
   the spacer includes a pair of extended portions which extend toward the terminals of the second electrodes of the cells, and are parallel to each other, and
   edges of the pair of extended portions close to the terminals of the second electrodes touch the second electrode current collector plate.

7. The battery module of claim 1, wherein the extended portion extends from an edge of the spacer toward the terminals of the second electrodes of the cells.

8. The battery module of claim 1, wherein
   the plurality of cells are aligned with the same polarity being in the same direction,
   the first electrode current collector plate electrically connects the terminals of the first electrodes of the plurality of cells in parallel, and
   the second electrode current collector plate electrically connects the terminals of the second electrodes of the plurality of cells in parallel.

9. The battery module of claim 1, wherein each cell is accommodated in the accommodation section so that an outer circumferential surface of the cell touches an inner circumferential surface of the accommodation section of the holder.

10. The battery module of claim 1, wherein the spacer is made of resin.

11. The battery module of claim 10, wherein the spacer is made of at least one material selected from the group consisting of polystyrene, polypropylene, polyphenylene ether, tetrafluoroethylene-perfluoroalkylvinylether copolymer, polycarbonate, polyphenylene sulfide, polybutylene terephthalate, and silicone.

12. The battery module of claim 1, wherein the holder is made of a material having thermal conductivity.

13. The battery module of claim 1, wherein the first electrode current collector plate and the second electrode current collector plate are formed by a first metal bus bar and a second metal bus bar, respectively.

14. A battery pack comprising:
   multiple ones of the battery module of claim 1, wherein the battery modules are aligned so that the extended portions of the spacers face the same direction.

* * * * *